July 14, 1970 D. W. PUFFER 3,520,730
FUEL CELL COMPRISING AN ELECTRODE FOLDED ALONG ONE EDGE
Filed Oct. 22, 1965 3 Sheets-Sheet 1
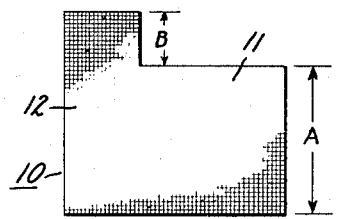
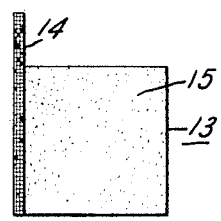
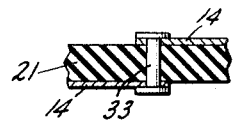
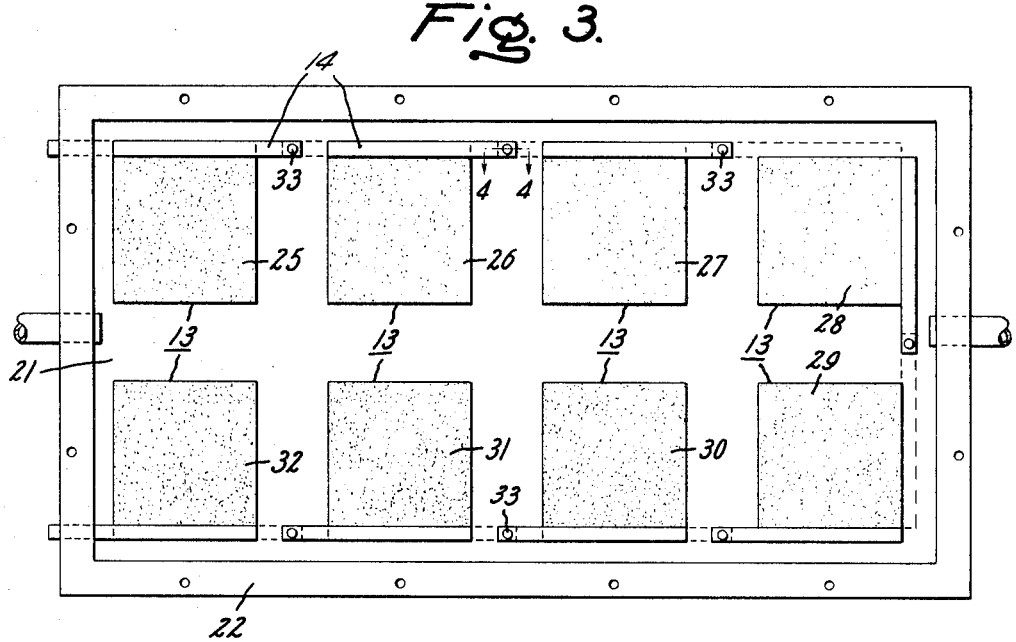
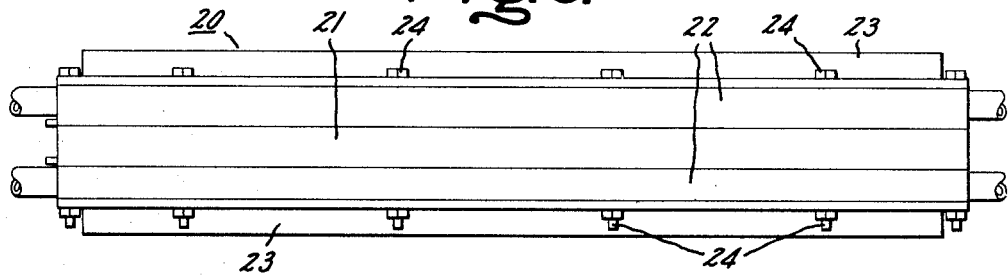
Inventor:
Daniel W. Puffer,
by Carl O. Thomas
His Attorney.

July 14, 1970  D. W. PUFFER  3,520,730
FUEL CELL COMPRISING AN ELECTRODE FOLDED ALONG ONE EDGE
Filed Oct. 22, 1965  3 Sheets-Sheet 2

Inventor:
Daniel W. Puffer,
by Carl O. Thomas
His Attorney.

July 14, 1970 D. W. PUFFER 3,520,730
FUEL CELL COMPRISING AN ELECTRODE FOLDED ALONG ONE EDGE
Filed Oct. 22, 1965 3 Sheets-Sheet 3
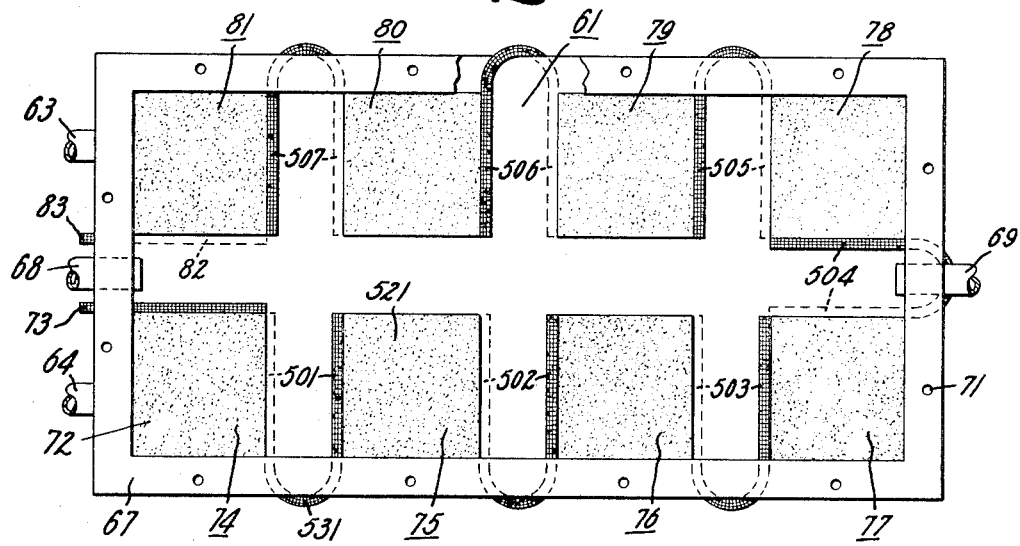
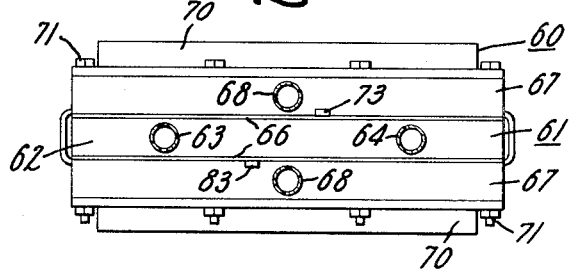
Inventor:
Daniel W. Puffer,
by Carl O. Thomas
His Attorney.

United States Patent Office 3,520,730
Patented July 14, 1970

3,520,730
FUEL CELL COMPRISING AN ELECTRODE FOLDED ALONG ONE EDGE
Daniel W. Puffer, Melrose, Mass., assignor to General Electric Company, a corporation of New York
Filed Oct. 22, 1965, Ser. No. 502,019
Int. Cl. H01m 27/00, 13/00
U.S. Cl. 136—86                                          12 Claims

ABSTRACT OF THE DISCLOSURE

A fuel cell unit is provided with an electrode having a current collector rolled or folded along one edge to act as an edge current bus and terminal strip. The fuel cell unit may have a number of spaced electrodes on opposite faces of the electrolyte element with the recumbent edge of the current collectors electrically connecting the electrodes in series.

---

My invention relates to an improved electron transfer structure.

In fabricating an electric cell incorporating an expensive substance such as a noble metal as an electrocatalyst, it is conventional practice to utilize the substance in finely divided form and in minimum amounts consistent with efficient electrocatalysis. Transport of electrons with respect to the electrocatalyst is effected by contiguously associating a foraminous, conductive element, commonly termed a current collector. Electrons are transported with respect to points remote from the current collector by conductively associated connector means.

It is an object of my invention to provide an improved electron transport structure.

It is a more specific object to provide an electron transfer structure of lower impedance.

It is another object to provide an electron transfer structure of more economic manufacture.

It is still another object to provide a unitary electron transfer structure.

It is a further object to provide an improved, high voltage fuel cell unit.

These and other objects of my invention are accomplished by providing an electron transfer structure including a gas permeable conductive element having a first portion contiguously associated with an electrocatalyst and an integral, recumbent second portion. Certain specific objects of my invention may be accomplished by providing a fuel cell unit including an electrolyte means having opposed faces and electron transfer structures as previously described mounted on at least one of said opposed faces.

Figure 6:
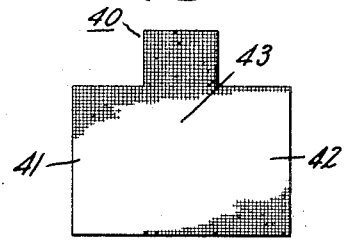
Figure 7:
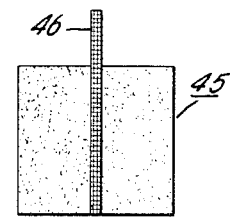
Figure 8:
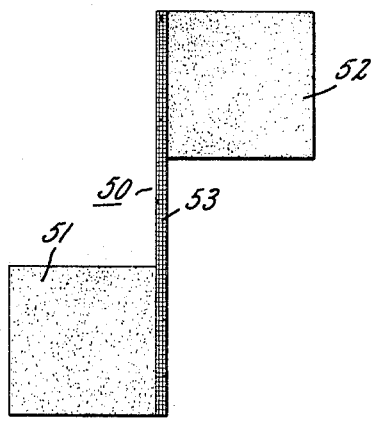
Figure 9:
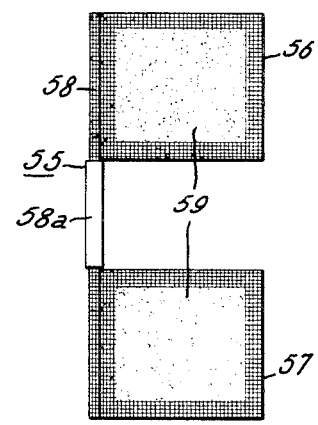
Figure 12:
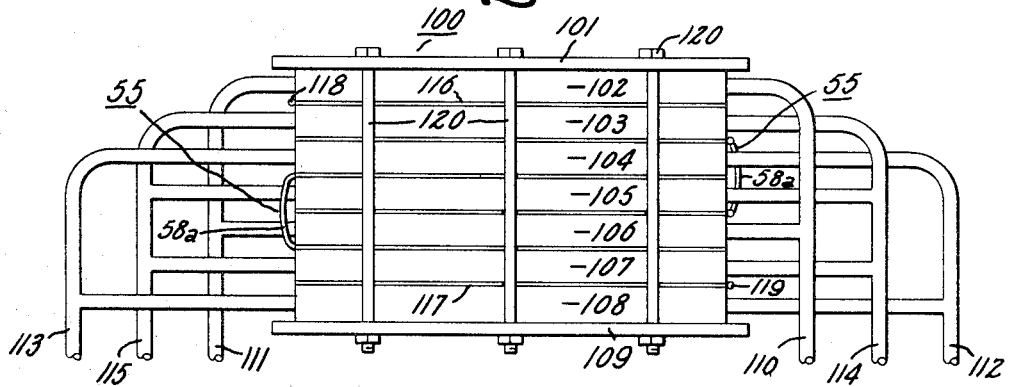

My invention may be better understood by reference to the following detailed description considered in conjunction with the drawings, in which:

FIG. 1 is an elevation of a current collector,
FIG. 2 is an elevation of an electron transfer structure,
FIG. 3 is a plan of a sub-combination,
FIG. 4 is a sectioned detail taken along line 4—4 in FIG. 3,
FIG. 5 is an elevation of a complete fuel cell unit,
FIG. 6 is an elevation of a modified current collector,
FIG. 7 is an elevation of a modified electron transfer structure,
FIG. 8 is an elevation of another modified electron transfer structure,
FIG. 9 is an elevation of still another modified electron transfer structure,
FIG. 10 is an elevation with parts broken away of a sub-combination,
FIG. 11 is an elevation of a modified fuel cell unit, and
FIG. 12 is an elevation of another modified fuel cell unit.

FIG. 1 illustrates a current collector 10 having a first portion 11 extending a distance A in one direction. A second portion 12 of the current collector is formed integrally with the first portion and extends a distance $A+B$ in one direction. The current collector may be formed of any gas permeable material of high electrical conductivity. The collector should be formed of materials that are resistant to corrosion in the environment of use. In fuel cell applications, nickel, silver, gold, titanium-palladium alloys, carbon, tantalum, etc., are suitable current collector materials. The current collector may be fabricated from expanded metal, chemically or mechanically perforated sheet material, woven fibrous material, felted fibrous materials, etc.

To fabricate a complete electron transfer structure 13 such as shown in FIG. 2, the second portion 12 of the current collector is made recumbent, that is, doubled back on itself one or more times, preferably several times. This may be accomplished by rolling, pleating, folding, etc. This simple procedure produces an integral, recumbent terminal strip 14. The integral nature of the terminal strip eliminates the step of joining an external lead. Also contact resistance is obviated by the integral construction. Further, the recumbent construction of my terminal strip allows higher conductivity and greater compactness than could be achieved with a mere extension of one edge of the current collector.

As shown in FIG. 2, the first portion of the current collector is covered with electrocatalyst 15. The electrocatalyst is preferably pressed into the voids of the first portion. In most instances, electrocatalyst is employed in the form of a finely divided particulate material, such as platinum black. Any one of a wide variety of binders may optionally be utilized with the electrocatalyst to prevent erosion of the finely divided material in use. Preferred binders also provide wet-proofing properties. Such binders are exemplified by fluorinated polyalkylene resins, such as polytetrafluoroethylene, polyvinylidene fluoride, polychlorotrifluoroethylene, fluorinated copolymers of ethylene and propylene, etc. The binder may be intimately intermingled with the electrocatalyst, overlie the electrocatalyst in a wet-proofing film, or both. The electrocatalyst may be supported on carbon particles, spinel, or boron carbide. The invention specifically contemplates but is not limited to noble metal electrocatalysts. Gas-permeable foils, such as palladium foil, may be associated with the first portion of the current collector instead of particulate material. Of course, while the electron transfer structure must be in contiguous relation with electrocatalyst in use, it is not necessary that the electrocatalyst contact the transfer structure prior to assembly. The electrocatalyst may be mounted on a surface of an electrolyte means for a fuel cell and the first portion of the current collector subsequently pressed there against.

FIGS. 3–5 inclusive illustrate a specific fuel cell application of electron transfer structures 13 formed according to my invention. A fuel cell unit 20 is comprised of an electrolyte means 21 having two insulative gaskets 22 mounted contiguously on either side thereof. Exterior of the gaskets are mounted housing members 23. The electrolyte means, gaskets, and housing members are held in assembled relation by tie-bolt assemblies 24.

The electrolyte means as shown in FIGS. 3–5 inclusive may be formed of or include an ion exchange material, such as an ion exchange resin. Alternately, the electrolyte means may be formed of a solid, porous matrix having a liquid electrolyte contained therein by capillary forces.

Mounted on either side of the electrolyte means are a plurality of electron transfer structures 13. As shown for purposes of illustration, eight transfer structures are mounted in spaced relation on each side of the electrolyte means. The portion of the structure contiguously associated with electrocatalyst is mounted directly opposite a similar structural portion of an electron transfer structure on the opposite face of the electrolyte means. Thus, eight separate cells 25–32 inclusive are formed by the electron transfer structures and the electrolyte means.

The cells are connected in series by the terminal strips. As shown in FIG. 4, connector means 33 extends through the electrolyte means 21 to connect terminal strips 14 of adjacent cells. Noting FIG. 3, the visible terminal strips in each of cells 25, 26, 27, 28, 29, 30 and 31 are connected to the remote terminal strips of the next higher numbered cells. The terminal strip on the remote side of cell 25 and on the visible side of cell 32 form the external terminals of my fuel cell unit.

FIG. 6 illustrates a modified current collector 40. The current collector includes two outer portions 41 and 42 and a central portion 43 of somewhat greater length integrally uniting the outer portions. To form an electron transfer structure such as 45 shown in FIG. 7, the central portion 43 of the current collector is doubled back on itself one or more times to form a recumbent terminal strip 46. The outer portions are then provided with electrocatalyst and/or binder as described with reference to electron transfer structure 13.

FIG. 8 illustrates another modified electron transfer structure 50. The structure is formed of spaced portions 51 and 52 comprised of current collector portions and electrocatalyst. The spaced portions are connected by a recumbent terminal strip 53 which is formed integrally with the current collectors of each of the spaced portions.

FIG. 9 illustrates still another modified electron transfer structure 55. The structure is formed of spaced portions 56 and 57 joined by recumbent terminal strip 58 integrally uniting the spaced portions. An insulative covering 58a surrounds the terminal strip 58 between the spaced portions. The electrocatalyst areas 59 are spaced from all edges of both of the spaced portions.

Electron transfer structures such as 45 may be substituted for the electron transfer structures 13 incorporated in fuel cell unit 20. In applications where the current collector of an electron transfer structure covers a large areal extent, the central location of the terminal strip may be advantageous in reducing resistive power losses in the electron transfer structure.

FIGS. 10 and 11 illustrate a specific application of electron transfer structures such as 50. The fuel cell unit 60 is formed of an electrolyte means 61 formed of an electrolyte gasket 62 having inlet and outlet conduits 63 and 64 for circulation of liquid electrolyte. Two sheets 66 of porous, electronically non-conductive material are mounted adjacent opposed sides of the electrolyte gasket to complete the electrolyte means. The sheets may be formed of porous, non-conductive material, such as porous resin sheets disclosed by Williams et al., Pat. No. 3,116,170, for example. Also, the resin sheets may be an ion exchange resin as taught by Tirrell, Pat. No. 3,152,015. Exterior of the sheets 66 are mounted gaskets 67, each having inlet and outlet ports 68 and 69. Housing members 70 are mounted exterior of each of the gaskets 67. Tie-bolt assemblies 71 extend around the edge of the fuel cell unit holding the housing members, gaskets, and sheets in assembled relation.

As illustrated in FIG. 10, an electron transfer structure 72 is mounted on the forward surface of electrolyte means 61. The electron transfer structure 72 is identical to the electron transfer structure 13 and to the lower half of structure 50. Terminal strip 73 of the structure extends outwardly of the unit between the electrolyte means and the gasket 67 to form one terminal of the cell unit.

An electron transfer structure 501 (identical in structure to electron transfer structure 50) is mounted with a first spaced portion similar to spaced portion 51 positioned opposite the structure 72 on the remote surface of the electrolyte means out of view. A second spaced portion 521 of structure 501 lies on the forward surface of the electrolyte means adjacent to but spaced from the structure 72. The spaced portions of the structure 501 are electrically united by an integrally formed terminal strip 531 which passes between the electrolyte means and the gasket 67 adjacent each of the forward and remote surfaces of the electrolyte means.

The first spaced portion of the structure 501, the electrolyte means, and the structure 72 cooperate to form a first cell 74. Similarly, the first spaced portion of an electron transfer structure 502, the electrolyte means, and the second spaced portion 521 of structure 501 cooperate to form a cell 75. In similar manner cells 76, 77, 78, 79, and 80 are formed by cooperation of the electrolyte means and spaced portions of electron transfer structures 502 and 503, 503 and 504, 504 and 505, 505 and 506, 506 and 507. Cell 81 is formed of the electrolyte means, structure 507, and an electron transfer structure 82 identical to structure 72. The structure 82 includes a terminal strip 83 which together with the terminal strip 73 forms the terminals of the fuel cell unit. While only one side of the sub-combination of FIG. 10 is illustrated, it is appreciated that the opposite side is identical.

The application of electron transfer structures such as 55 to fuel cell units is illustrated with reference to FIG. 12. The fuel cell unit 100 is comprised of a stack including end plate 101, gaskets 102–108 inclusive, and end plate 109. The stack is held in assembled relation by tie-bolt assemblies 120. Oxidant inlet and outlet conduits 110 and 111 are connected to gaskets 102 and 106. Fuel inlet and outlet conduits 112 and 113 are connected to gaskets 104 and 108. Electrolyte inlet and outlet conduits 114 and 115 are connected to gaskets 103, 105, and 107.

Sandwiched between each adjacent gasket is a spaced portion of an electron transfer structure. Electron structures 116 and 117 are mounted between gaskets 102 and 103 and between gaskets 107 and 108, respectively. The integral recumbent terminal strips 118 and 119 serve as terminals for the fuel cell unit.

An electron transfer structure 55 includes spaced portions lying between gaskets 103 and 104 as well as between gaskets 105 and 106. Insulative covering 58a for integral terminal strip 58 is shown extending between the spaced portions of the structure. In like manner, another electron transfer structure 55 including spaced portions lying between gaskets 104 and 105 as well as between gaskets 106 and 107 is illustrated with an insulative covering 58a extending between the spaced portions.

The electron transfer structures are each provided with an electrocatalyst area lying interiorly, spaced from each edge, as shown in FIG. 9 with reference to structure 55. The electrocatalyst areas on each of the spaced portions of the structures correspond to interior openings in the gaskets. Leakage of electrolyte from the electrolyte gaskets into the fuel and oxidant gaskets is prevented by the incorporation of wet-proofing material in the electrocatalyst areas according to well known and understood techniques.

The fuel cell unit 100 is comprised of three fuel cells electrically connected in series. It is noted that this is accomplished without resort to any internal connectors other than the integrally formed terminal strips extending between the spaced portions of the electron transfer structures. This allows internal resistive power losses to be held to a minimum. Further, since the internal electrical connections are provided by the electron transfer structures themselves, the fuel cell unit is more efficiently formed than conventional units.

While my invention has been described with reference to certain preferred embodiments, it is appreciated that numerous modifications will be obvious to those skilled in the art. For example, a plurality of integral, recumbent terminal strips may be included in each electron transfer structure rather than only one as shown. The terminal strips may be positioned longitudinally, laterally, or diagonally along any edge or on any surface of the electron transfer structures. The terminal strips may extend beyond the remainder of the structures in more than one direction, if desired.

The fuel cell units shown are only intended as exemplary. My invention is applicable to units formed of only a single cell, that is, having only one electron transfer structure on each of two opposed surfaces of an electrolyte means. The number of electron transfer structures in the fuel cell units shown are chosen merely for purposes of illustrating my invention. Any number of electron transfer structures could, of course, be incorporated into a fuel cell unit.

Since these and other modifications are contemplated, it is intended that the scope of my invention be determined with reference to the following claims.

What I claim as new and desire to secure by Letters Patent of the United States is:

1. In a cell unit having an electrode capable of electrochemically consuming a gas mounted at the interface of the gas and an electrolyte, the improvement in which said electrode is comprised of:
a current collector including:
a fluid permeable first portion and
a second portion integral with one entire edge of said first portion and extending beyond said first portion in a direction along said integral edge, said second portion being turned back on itself to improve edge current collection, and
a finely divided particulate electrocatalyst supported by said first portion.

2. An electron transfer structure according to claim 1 in which a wet-proofing agent is associated with said electrocatalyst.

3. An electron transfer structure according to claim 1 in which a wet-proofing agent forms a thin film overlying said electrocatalyst.

4. An electron transfer structure according to claim 1 in which said electrocatalyst is spaced from each edge of said first portion.

5. In a unit comprised of a plurality of cells electrically connected in series each having an electrode capable of electrochemically consuming a gas mounted at the interface of the gas and an electrolyte, the improvement in which two of said electrodes, one from each of two electrically serially related cells, are integrally formed and comprise:
a common current collector including:
spaced fluid permeable first portions and
a second portion integral with one edge of each of said first portions and interconnecting said first portions, said second portion being turned back on itself to improve edge current collection, and
a finely divided particulate electrocatalyst supported by said first portion.

6. An electron transfer structure according to claim 5 in which said spaced portions are united to one side of said recumbent means.

7. An electron transfer structure according to claim 5 in which said spaced portions are united to opposite sides of said recumbent means.

8. An electron transfer structure according to claim 5 additionally including means insulatively covering at least a portion of said recumbent means.

9. A fuel cell unit comprising:
an ion exchange resin electrolyte means providing first and second parallel, planar surfaces,
means providing for fuel contact with said first planar surface,
means providing for oxidant contact with said second planar surface,
a plurality of electron transfer means mounted in spaced relation on each of said first and second planar surfaces, each of said electron transfer means including a current collector formed of a conductive element having first and second integrally related portions, said first portion being gas permeable, said second portion being recumbent and extending along an entire edge of said first portion and beyond said first portion, and a finely divided, particulate electrocatalyst associated with each of said first portions,
the first portion of each electron transfer means mounted on said first planar face being directly opposite the first portion of an electron transfer means mounted on said second planar face, such that each pair of opposed electron transfer means cooperate with the electrolyte means to form a separate cell, and
means connecting said cells in series.

10. A fuel cell unit according to claim 9 in which said connecting means extends through said electrolyte means.

11. A fuel cell unit according to claim 9 in which said connecting means extends externally of said electrolyte means.

12. A fuel cell unit according to claim 9 in which said connecting means includes a second portion adjacent said first surface which is integral with a second portion adjacent said second surface.

References Cited

UNITED STATES PATENTS

| | | | |
|---|---|---|---|
| 182,101 | 9/1876 | Byrne | 136—120.1 |
| 710,278 | 9/1902 | Klinker | 136—121 |
| 3,216,911 | 11/1965 | Kronenberg | 136—86 |
| 3,230,113 | 1/1966 | Herold | 136—120 |
| 3,252,839 | 5/1966 | Langer et al. | 136—86 |
| 3,287,163 | 11/1966 | Steffens | 136—134 |

FOREIGN PATENTS 1,006,165  1/1952  France.

JOHN H. MACK, Primary Examiner

H. A. FEELEY, Assistant Examiner

U.S. Cl. X.R.

136—120